United States Patent
Park et al.

(10) Patent No.: US 9,924,446 B2
(45) Date of Patent: Mar. 20, 2018

(54) METHOD AND APPARATUS FOR RECEIVING SIGNAL BY NAN DEVICE IN WIRELESS COMMUNICATION SYSTEM

(71) Applicant: LG ELECTRONICS INC., Seoul (KR)

(72) Inventors: Giwon Park, Seoul (KR); Dongcheol Kim, Seoul (KR); Byungjoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/309,148

(22) PCT Filed: Jan. 26, 2015

(86) PCT No.: PCT/KR2015/000784
§ 371 (c)(1),
(2) Date: Nov. 4, 2016

(87) PCT Pub. No.: WO2015/170818
PCT Pub. Date: Nov. 12, 2015

(65) Prior Publication Data
US 2017/0111849 A1    Apr. 20, 2017

Related U.S. Application Data

(60) Provisional application No. 61/990,060, filed on May 7, 2014, provisional application No. 62/039,922, filed
(Continued)

(51) Int. Cl.
*H04W 84/12* (2009.01)
*H04W 76/02* (2009.01)
*H04W 48/08* (2009.01)

(52) U.S. Cl.
CPC ........... *H04W 48/08* (2013.01); *H04W 76/02* (2013.01); *H04W 84/12* (2013.01)

(58) Field of Classification Search
CPC ...... H04W 84/12; H04W 48/08; H04W 76/02
(Continued)

(56) References Cited

U.S. PATENT DOCUMENTS

| 2013/0010777 A1 | 1/2013 | Periyalwar et al. |
| 2014/0080481 A1 | 3/2014 | Abraham et al. |

(Continued)

FOREIGN PATENT DOCUMENTS

| JP | 2016210993 | 12/2016 |
| KR | 1020100125103 | 11/2010 |

(Continued)

OTHER PUBLICATIONS

PCT International Application No. PCT/KR2015/000784, Written Opinion of the International Searching Authority dated May 1, 2015, 16 pages.
(Continued)

*Primary Examiner* — Inder Mehra
(74) *Attorney, Agent, or Firm* — Lee, Hong, Degerman, Kang & Waimey

(57) ABSTRACT

A method for receiving a signal by a neighbor awareness networking (NAN) device in a wireless communication system, according to an embodiment of the present invention, comprises the steps of: receiving a NAN-related frame from an access point (AP); and obtaining information about the AP from information comprised in the NAN-related frame, wherein the information about the AP is comprised in a service ID list attribute or a WLAN infrastructure attribute.

19 Claims, 10 Drawing Sheets

Related U.S. Application Data on Aug. 21, 2014, provisional application No. 62/046,145, filed on Sep. 4, 2014.

(58) Field of Classification Search
USPC ...... 455/426.2, 432.2, 434, 524, 528, 422.1, 455/426.1, 445, 450, 465, 41.2, 560, 551; 370/254
See application file for complete search history.

(56) References Cited

U.S. PATENT DOCUMENTS

| | | | |
|---|---|---|---|
| 2014/0112189 A1* | 4/2014 | Abraham | H04W 4/206 370/254 |
| 2015/0200811 A1* | 7/2015 | Kasslin | H04L 41/12 370/254 |
| 2016/0337838 A1* | 11/2016 | Lee | H04W 48/14 |
| 2017/0208559 A1* | 7/2017 | Tamura | H04W 8/005 |

FOREIGN PATENT DOCUMENTS

| | | |
|---|---|---|
| WO | 2012/036992 | 3/2012 |
| WO | 2013/174428 | 11/2013 |
| WO | 2014/035603 | 3/2014 |
| WO | 2014/043377 | 3/2014 |
| WO | 2014/049950 | 4/2014 |
| WO | 2014/066534 | 5/2014 |

OTHER PUBLICATIONS

Mobile Press, "Pocket PC All Around," Nov. 24, 2013, 4 pages.

* cited by examiner (a)

(b)

METHOD AND APPARATUS FOR RECEIVING SIGNAL BY NAN DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2015/000784, filed on Jan. 26, 2015, which claims the benefit of U.S. Provisional Application No. 61/990,060, filed on May 7, 2014, 62/039,922, filed Aug. 21, 2014 and 62/046,145, filed on Sep. 4, 2014, the contents of which are all hereby incorporated by reference herein in their entirety.

TECHNICAL FIELD

The present invention relates to a wireless communication system, and more particularly, to a method for receiving a signal in a NAN (Neighbor Awareness Networking) terminal and apparatus therefor.

BACKGROUND ART

With a recent advancement of an information communication technology, various wireless communication technologies are currently developed. Among them, a wireless LAN (WLAN) is a technology for enabling a wireless Internet access at home or a company or in a specific service-provided area using portable terminals such as a personal digital assistant (PDA), a laptop computer, a portable multimedia player (PMP) and the like.

DISCLOSURE OF THE INVENTION

Technical Task

The technical task of the present invention is to provide a method of searching for a Wi-Fi network using NAN (Neighbor Awareness Networking).

The technical problems solved by the present invention are not limited to the above technical problems and those skilled in the art may understand other technical problems from the following description.

Technical Solutions

In one technical aspect of the present invention, provided herein is a method of receiving a signal in a NAN (Neighbor Awareness Networking) terminal of a wireless communication system, including receiving a NAN-related frame from an AP (Access Point) and obtaining an information on the AP from an information included in the NAN-related frame, wherein the information on the AP is included in a service ID list attribute or in a WLAN infrastructure attribute.

In another technical aspect of the present invention, provided herein a NAN (Neighbor Awareness Networking) terminal in a wireless communication, including a receiving module and a processor, wherein the processor is configured to receive a NAN-related frame from an AP (Access Point) and obtain an information on the AP from an information included in the NAN-related frame and wherein the information on the AP is included either in a service ID list attribute or in a WLAN infrastructure attribute.

The embodiments of the present invention may include the whole or a part of the following points.

If the information on the AP is included in the WLAN infrastructure attribute, the infrastructure attribute may include an information indicating whether the AP is a passpoint AP and an information indicating an attribute of the AP.

If the information on the AP is included in the service ID list attribute, the AP may be indicated by a service ID.

The NAN-related frame reception of the terminal may be irrespective of whether a Wi-Fi module of the NAN terminal is turned on.

The NAN-related frame may include one of a NAN discovery beacon frame, a NAN synchronization beacon frame and a NAN service discovery frame.

If the terminal is in a standby mode state, a display unit of the terminal may display a pop-up window indicating that the AP has been discovered.

If the standby mode state is released, the terminal may perform a procedure for making an association with the AP.

If the AP is a subscribed passpoint AP, a display of the pop-up window may be omitted.

If a standby mode state of the terminal is released, a display unit of the terminal may display a pop-up window indicating that the AP has been discovered.

If a user input signal for the pop-up window is received, the terminal may perform a procedure for making an association with the AP.

If the AP is a subscribed passpoint AP, the display of the pop-up window may be omitted.

The NAN terminal may be a terminal supporting a passpoint.

Advantageous Effects

According to the present invention, power consumption can be significantly reduced and usability of a Wi-Fi network can be enhanced.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram to illustrate a discovery window and the like.

BEST MODE FOR INVENTION

Figure 1:
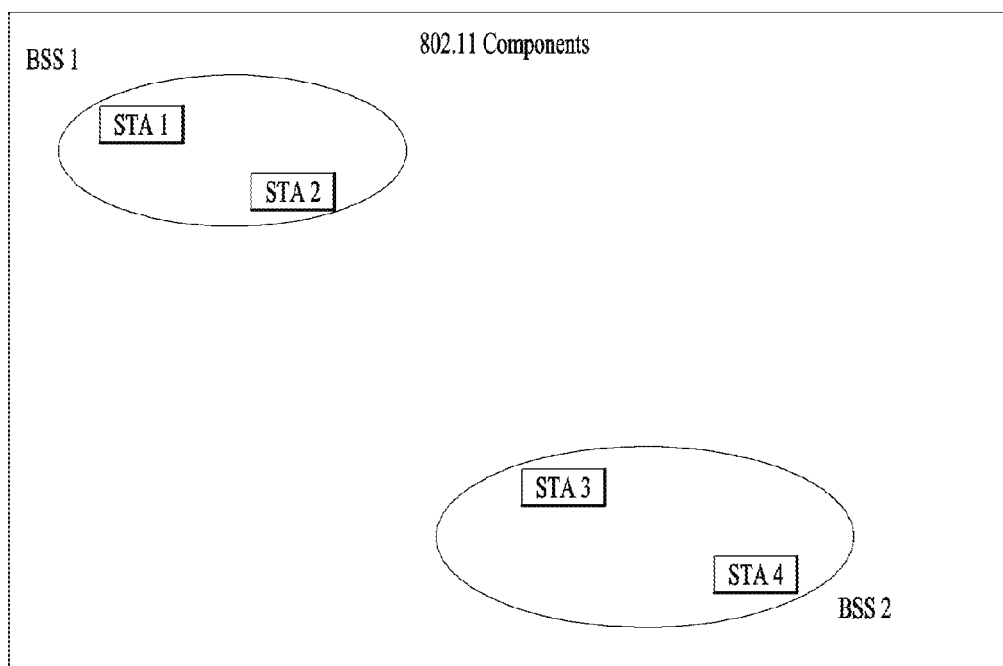
FIG. 1 is a diagram to illustrate an example of the structure of IEEE 802.11.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
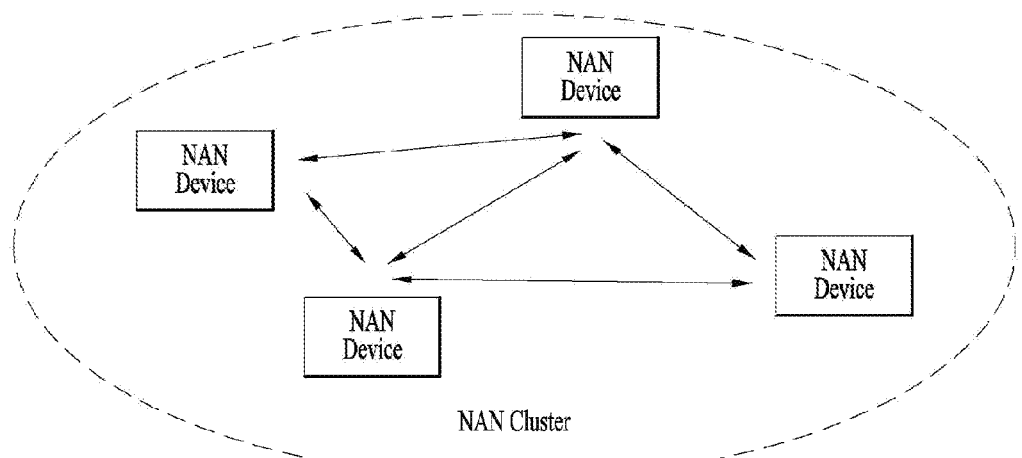
FIG. 2 and FIG. 3 are diagrams to illustrate an example of a NAN cluster.
Figure 3:
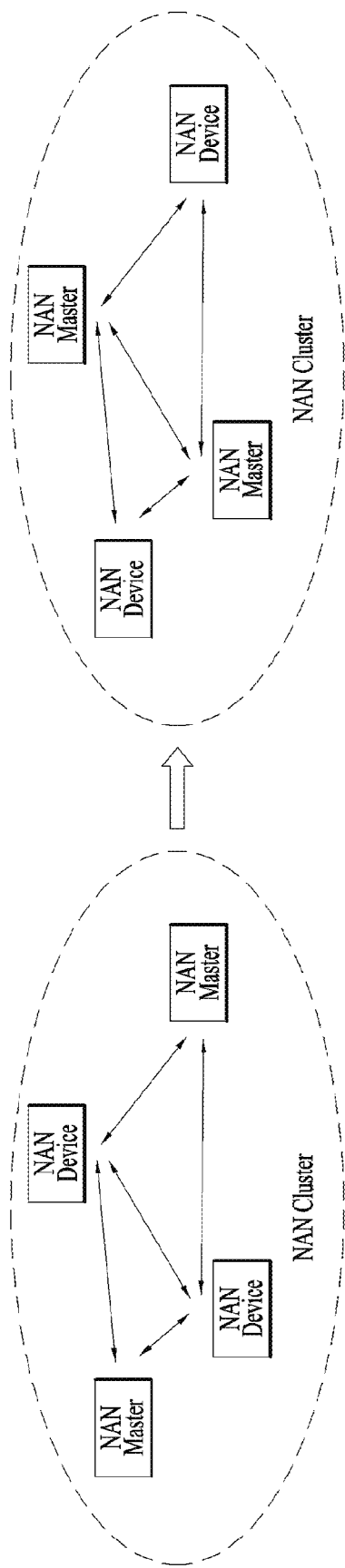

A NAN network can be constructed with NAN devices (terminals) that use a set of identical NAN parameters (e.g., a time interval between consecutive discovery windows, an interval of a discovery window, a beacon interval, a NAN channel, etc.). A NAN cluster can be formed by NAN terminals and the NAN cluster means a set of NAN terminals that are synchronized on the same discovery window schedule. And, a set of the same NAN parameters is used in the NAN cluster. FIG. 2 illustrates an example of the NAN cluster. A NAN terminal included in the NAN cluster may directly transmit a multicast/unicast service discovery frame to a different NAN terminal within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
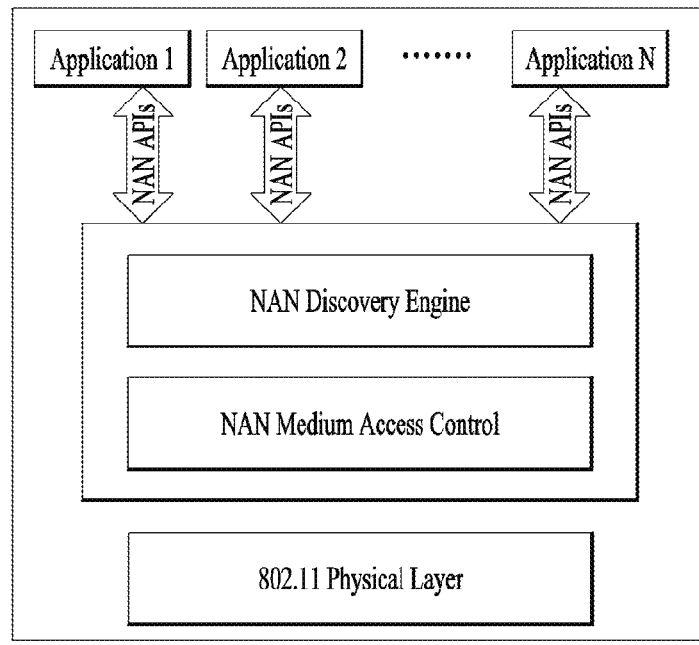
FIG. 4 illustrates an example of the structure of a NAN terminal.

FIG. 4 illustrates an example of a structure of a NAN device (terminal). Referring to FIG. 4, the NAN terminal is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
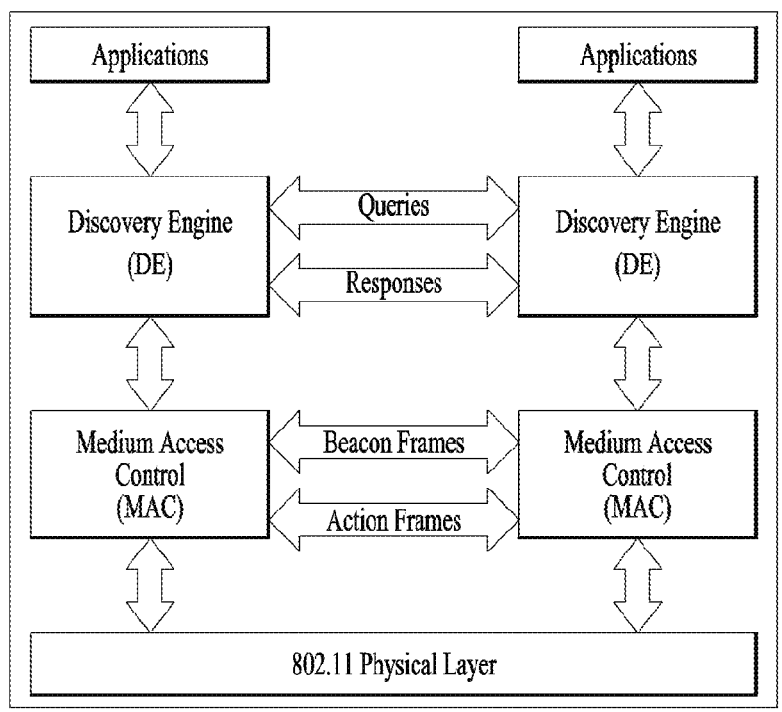
FIG. 5 and FIG. 6 illustrate relations among NAN components.
Figure 6:
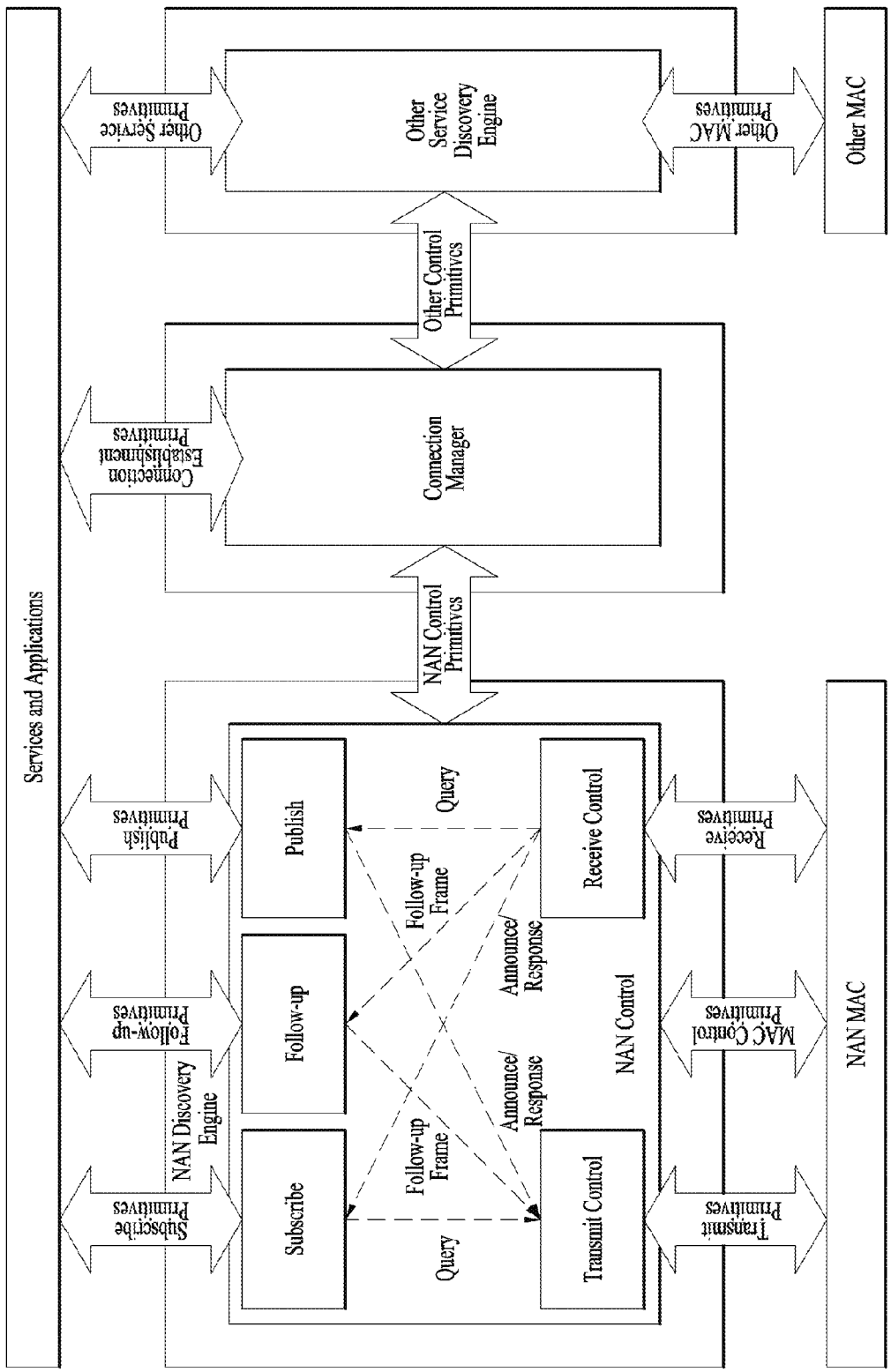

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
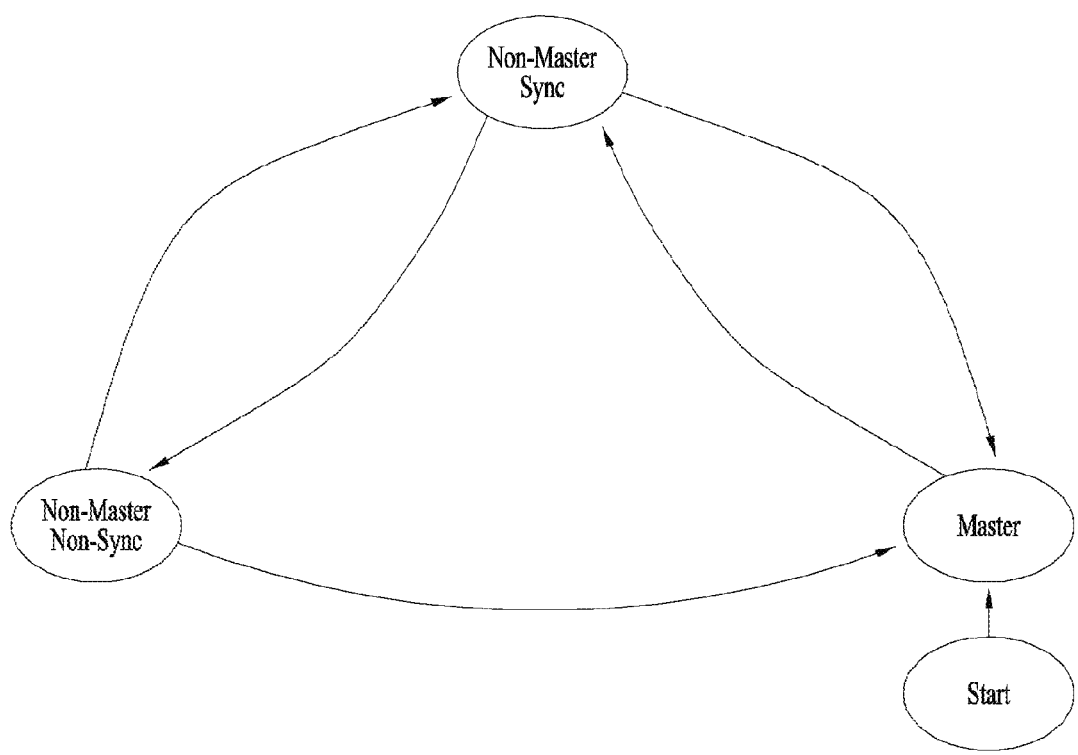
FIG. 7 is a diagram to illustrate a state transition of a NAN terminal.

As mentioned in the foregoing description, a NAN device (terminal) can serve as a NAN master and the NAN master can be changed. In other words, roles and states of the NAN terminal can be shifted in various ways and related examples are illustrated in FIG. 7. The roles and states, which the NAN terminal can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN terminal can be determined according to a master rank (MR). The master rank indicates the preference of the NAN terminal to serve as the NAN master. In particular, a high master rank means strong preference for the NAN master. The NAN MR can be determined by Master Preference, Random Factor, Device MAC address, and the like according to Formula 1.

$$MasterRank = MasterPreferences*2^{56} + RandomFactor*2^{48} + MAC[5]*2^{40} + \ldots MAC[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN terminal that activates a NAN service and initiates a NAN cluster, each of the Master Preference and the Random Factor is set to 0 and NANWarmUp is reset. The NAN terminal should set a Master Preference field value in the master indication attribute to a value greater than 0 and a Random Factor value in the master indication attribute to a new value until when the NANWarmUp expires. When a NAN terminal joins a NAN cluster in which the Master Preference of an anchor master is set to a value greater than 0, the corresponding NAN terminal may set the Master Preference to a value greater than 0 and the Random Factor to a new value irrespective of expiration of the NANWarmUp.

Moreover, a NAN terminal can become an anchor master of a NAN cluster depending on an MR value. That is, all NAN terminals have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN terminal becomes an anchor master of a currently existing NAN cluster, the NAN terminal adopts TSF used in the currently existing NAN cluster without any change.

The NAN terminal can become the anchor master in the following cases: if a new NAN cluster is initiated; if the master rank is changed (e.g., if an MR value of a different NAN terminal is changed or if an MR value of the anchor master is changed); or if a beacon frame of the current anchor master is not received any more. In addition, if the MR value of the different NAN terminal is changed or if the MR value of the anchor master is changed, the NAN terminal may lose the status of the anchor master. The anchor master can be determined according to an anchor master selection algorithm in the following description. In particular, the anchor master selection algorithm is the algorithm for determining which NAN terminal becomes the anchor master of the NAN cluster. And, when each NAN terminal joins the NAN cluster, the anchor master selection algorithm is driven.

If a NAN terminal initiates a new NAN cluster, the NAN terminal becomes the anchor master of the new NAN cluster. If a NAN synchronization beacon frame has a hop count in excess of a threshold, the NAN synchronization beacon frame is not used by NAN terminals. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN terminal compares an anchor master rank value in the beacon frame with a stored anchor master rank value. If the stored anchor master rank value is greater than the anchor master value in the beacon frame, the NAN terminal discards the anchor master value in the beacon frame. If the stored anchor master value is less than the anchor master value in the beacon frame, the NAN terminal newly stores values greater by 1 than the anchor master rank and the hop count included in the beacon frame and an AMBTT value in the beacon frame. If the stored anchor master rank value is equal to the anchor master value in the beacon frame, the NAN terminal compares hop counters. Then, if a hop count value in the beacon frame is greater than a stored value, the NAN terminal discards the received beacon frame. If the hop count value in the beacon frame is equal to (the stored value −1) and if an AMBTT value is greater than the stored value, the NAN terminal newly stores the AMBTT value in the beacon frame. If the hop count value in the beacon frame is less than (the stored value −1), the NAN terminal increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN terminal exceeds the stored AMBTT value by more than 16*512 TUs (e.g., 16 DW periods), the NAN terminal may assume itself as an anchor master and then update an anchor master record. In addition, if any of MR related components (e.g., Master Preference, Random Factor, MAC Address, etc.) is changed, a NAN terminal not corresponding to the anchor master compares the changed MR with a stored value. If the changed MR of the NAN terminal is greater than the stored value, the corresponding NAN terminal may assume itself as the anchor master and then update the anchor master record.

Moreover, a NAN terminal may set anchor master fields of the cluster attributes in the NAN synchronization and discovery beacon frames to values in the anchor master record, except that the anchor master sets the AMBTT value to a TSF value of corresponding beacon transmission. The NAN terminal, which transmits the NAN synchronization beacon frame or the discovery beacon frame, may be confirmed that the TSF in the beacon frame is derived from the same anchor master included in the cluster attribute.

Moreover, a NAN terminal may adopt a TSF timer value in a NAN beacon received with the same cluster ID in the following case: i) if the NAN beacon indicates an anchor master rank higher than a value in an anchor master record of the NAN terminal; or ii) if the NAN beacon indicates an anchor master rank equal to the value in the anchor master record of the NAN terminal and if a hop count value and an AMBTT value in the NAN beacon frame are larger values in the anchor master record.

NAN Synchronization

NAN terminals (devices) participating in the same NAN Cluster may be synchronized with respect to a common clock. A TSF in the NAN cluster can be implemented through a distributed algorithm that should be performed by all the NAN terminals. Each of the NAN terminals participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN terminals may transmit synchronization beacon frames in order to help all NAN terminals in the NAN cluster synchronize their own clocks.

NAN beacon transmission is distributed. A NAN beacon frame is transmitted during a DW period existing at every 512 TU. All NAN terminals can participate in generation and transmission of the NAN beacon according to their roles and states. Each of the NAN terminals should maintain its own TSF timer used for NAN beacon period timing. A NAN synchronization beacon interval can be established by the NAN terminal that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
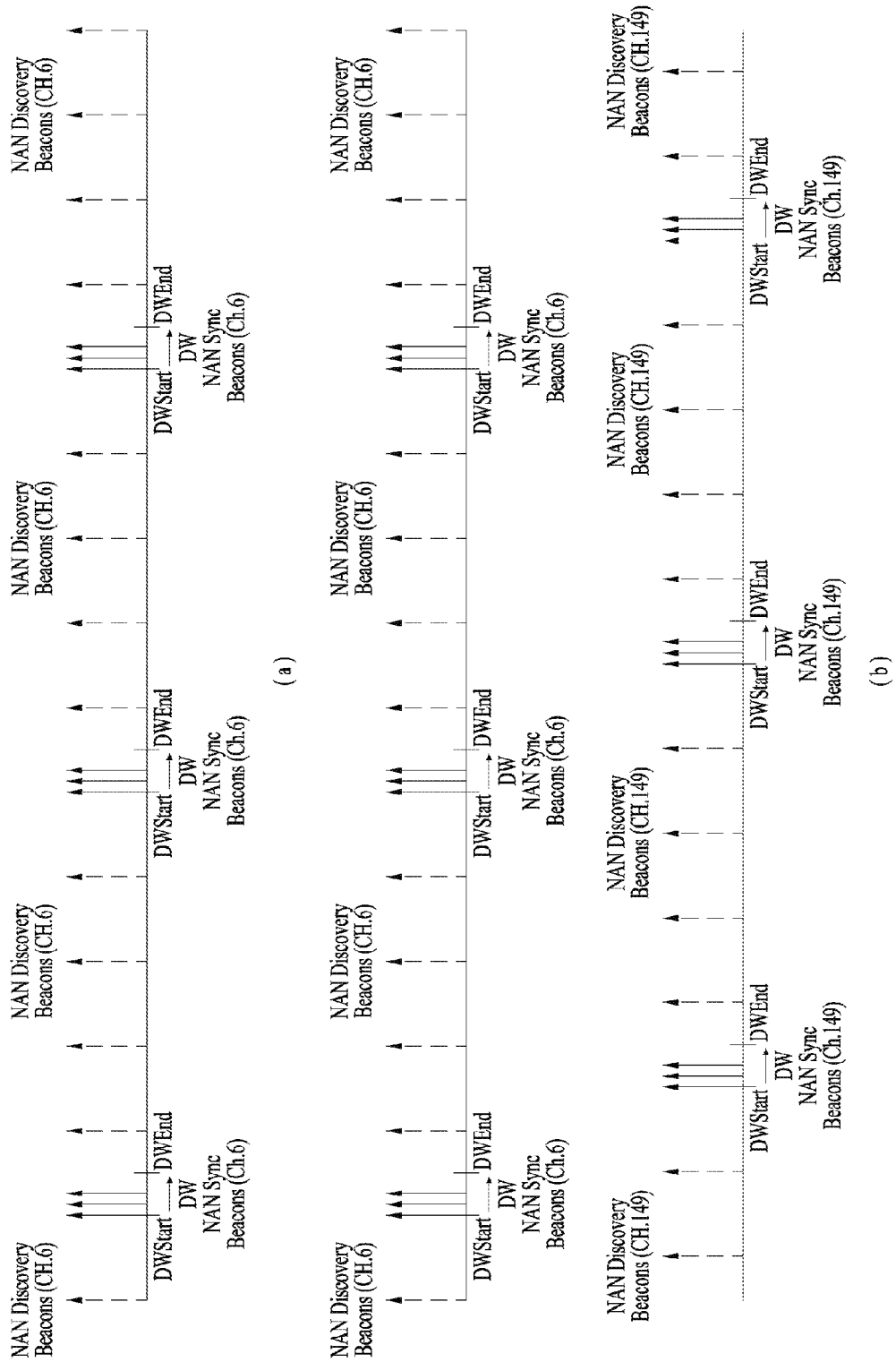

Each NAN terminal serving as a NAN master transmits a NAN discovery beacon frame from out of a NAN discovery window. On average, the NAN terminal serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN terminal participates, the NAN terminal serving as the NAN master is able to omit transmission of the NAN discovery beacon frame. In order to minimize power required to transmit the NAN discovery beacon frame, the NAN terminal serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN terminal operating in 2.4 GHz band. FIG. 8 (b) shows transmission of NAN discovery and synchronization beacon frames of a NAN terminal operating in 2.4 GHz and 5 GHz bands.

A method of accessing a Wi-Fi network using the above-described NAN will be described below. A related art user equipment is configured to selectively turn on/off a Wi-Fi module for connection to a Wi-Fi network. It is because maintaining the on-state of the Wi-Fi module will cause considerable power consumption of the user equipment. For this reason, a user frequently leaves the Wi-Fi module in an off-state. Another reason why the user leaves the Wi-Fi module in the off-state is because even if a Wi-Fi network is found, the found Wi-Fi network is not connectible frequently, or because even after connection to the Wi-Fi network, a normal service is not providable frequently. Yet, if the user leaves the Wi-Fi module in the off-state, it may cause a problem that usability of Wi-Fi decreases. On the contrary, as described below, by a method of accessing a Wi-Fi network using a NAN interface according to an embodiment of the present invention, usability of the Wi-Fi network can be enhanced despite significantly reducing power consumption, which will be described in detail below. A terminal (or STA) in the following description may include a terminal having the above-described NAN function implemented therein.

A terminal according to an embodiment of the present invention may use a NAN interface in order to discover a Wi-Fi network. Particularly, the terminal can discover a passpoint AP through the NAN interface by defining a passpoint AP discovery as one service ID. To this end, an AP having an NAN function implemented therein can play a role as a master of a NAN network. Namely, the AP can transmit a NAN-related frame (NAN discovery beacon frame, NAN synchronization beacon frame, NAN service discovery frame) including NAN information. A NAN information element possibly included in the NAN-related frame may include a service ID defined for searching for a passpoint AP or a WLAN network and/or a WLAN infrastructure attribute. A passpoint AP having a NAN function implemented therein can announce a passpoint service through i) a newly defined service ID (this may indicate a passpoint AP), or ii) the NAN-related frame by enabling a passpoint AP indication to be included in the WLAN infrastructure attribute.

In aspect of a NAN terminal, a terminal may receive a NAN-related frame from an AP and then obtain information on the AP from information included in the NAN-related frame. In this case, the information on the AP may be included in one of a service ID list attribute and a WLAN infrastructure attribute. Particularly, a NAN information element may be represented as Table 3 below and a NAN attribute included in the NAN information element may be represented as Table 4 below.

TABLE 3

| Field | Size (Octets) | Value (Hex) | Description |
|---|---|---|---|
| Attribute ID | 1 | Variable | Identifies the type of NAN attribute as defined in Table 5-4. |

TABLE 3-continued

| Field | Size (Octets) | Value (Hex) | Description |
|---|---|---|---|
| Length | 2 | Variable | Length of the following fields in the attribute |
| Attribute Body Field | Variable | Variable | NAN Attribute specific information fields |

TABLE 4

| Attribute | | NAN Beacons | | |
| ID | Description | Sync | Discovery | NAN SDF |
|---|---|---|---|---|
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13-220 | Reserved | NA | NA | NA |
| 221 | Vendor Specific Attribute | YES/O | YES/O | YES/O |
| 222-255 | Reserved | NA | NA | NA |

In the above Table 4, the service ID list attribute can be configured as Table 5 below. Therefore, if information on AP is included in the service ID list attribute, the AP can be indicated by a service ID (field) in Table 5.

TABLE 5

| Field | Size (octets) | Value | Description |
|---|---|---|---|
| Attribute ID | 1 | 0x02 | Identifies the type of NAN attribute. |
| Length | 2 | Variable | Length of the following fields in the attribute. |
| Service ID | 6 * N | Variable | One or more Service IDs, where N is the number of Service IDs in this container. |

And, in Table 4, the WLAN infrastructure attribute can be represented as Table 6 below. Namely, the WLAN infrastructure attribute can include information (Passpoint AP indication) indicating whether the AP is a passport AP and information (Passpoint AP Attributes) indicating the attributes of the AP.

TABLE 6

| Field | Size (octets) | Value | Description |
|---|---|---|---|
| Attribute ID | 1 | 0x05 | Identifies the type of NAN attribute. |
| Length | 2 | Variable | Length of the following fields in the attribute. |
| MAC Address | 6 | Variable | BSSID of the AP. |
| Map Control | 1 | Variable | The availibity channel and time map control information |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availibity Itnerval Duration subfield of the Map Control field. A NAN device that sets the i-th bit of the Availability Intervals Bitmap to 1 shall be present during the corresponding i-th time interval in the operation channel indicated by teh associated Further Availiability Map attribute. A NAN device that sets the i-th bit of the Availability Intervals Bitmap to 0 may be present during the correspnding i-th time interval in the operation channel indicated by the associated Further Availability Map attribute. |
| Device Role | 1 | Variable | Identifies the Device role in the WLAN Infrastructure, 0 means AP and 1 means non-AP STA. |
| Passpoint AP indication | 1 | | Indicates supporting Passpoint. Among 8bits, only 1 bit of LSB or MSB is used and the rest of the bits is reserved (set to 0). If the value of 1 bit of LSB or MSB is 1, this indicates Passpoint AP. If the value is 0, this indicates an AP not supporting Passpoint. |
| Passpoint AP Attributes | Variable | | This is included when 1 bit of MSB or LSB is set to 1 (AP supporting Passpoint) in Passpoint AP Indication field. Attributes of Passpoint AP are included. |

In Table 6, the information (Passpoint AP Attributes) indicating the attributes of the AP can be configured as Table 7 below.

TABLE 7

| Field | Size (octets) | Value | Description |
|---|---|---|---|
| Attribute ID | 1 | | |
| Length | 2 | | |
| Network Type | | | Indicates Network Type-Public (in case of Public hotspot, represented as Operator Name)-Private (in case of Private hotspot, represented as Private or Unknown) |
| Cost Type | | | Indicate Cost Type-Free or Non Free |
| UL Speed | | | Indicates UL Speed |
| DL Speed | | | Indicates DL Speed |
| Security Type | | | Indicates Security Type- e.g., WPA2 |
| Authentication Type | | | Indicates Authentication Type-EAP-AKA-EAP-SIM-EAP-TLS-EAP-TTLS |
| RRSI value | | | Indicates RSSI value |
| Venue information | | | Indicates venue information- e.g., Starbucks, Stadium and etc |
| Operating Class | | | Frequency band information currently operated in AP |
| Supported Operating Class | | | Frequency band inforamtion supported in AP |
| OSU Providers list | | | AP coordinate information |
| Country Code | | | Country code |

Alternatively, as shown in Table 8 below, it may be defined as an attribute of the same level of the WLAN infrastructure attribute.

TABLE 8

| Field | Size (Octets) | Value | Description |
|---|---|---|---|
| Attribute ID | 1 | | |
| Length | 2 | | |
| MAC Address | 6 | | BSSID of the AP |
| MAP Control | 1 | | |
| Availability Intervals Bitmap | Variable | | |
| Device Roll | Variable | | |
| Network Type | | | Indicates Network Type Public (in case of Public hotspot, represented as Operating Name) Private (in case of Private hotspot, represented as Private or Unknown) |
| Cost type | | | Indicate Cost Type-Free or Non Free |
| UL Speed | | | Indicates UL Speed |
| DL Speed | | | Indicates DL Speed |
| Security Type | | | Indicates Security Type-e.g., WPA2 |
| Authentication Type | | | Indicates Authentication TypeEAP-AKAEAP-SIMEAP-TLSEAP-TTLS |
| RSSI value | | | Indicates RSSI value |
| Venue information | | | Indicates venue information-e.g., Starbucks, Stadium and etc. |
| Operating Class | | | Frequency band information currently operated in AP |
| Supported Operating Class | | | Frequency band information supported in AP |
| OSU Providers list | | | |
| Indoor location | | | AP coordinate information |

As described above, the terminal having received the information on the AP may be associated with the AP automatically on a specific condition or by a user's selection. Particularly, the terminal's reception of the NAN-related frame may be performed irrespective of whether the Wi-Fi module of the terminal is turned on. In other words, since a service discovery is performed through a NAN interface operating in the background, the discovery is possible irrespective of whether the Wi-Fi module operates.

If the NAN function is not implemented in the AP, the terminal can discover the Wi-Fi network by receiving a beacon frame through a passive scan (at least once in 512 TUs). Alternatively, the terminal can perform the discovery by transmitting Probe Request within 512 TUs and receiving Probe Response from general APs having the NAN function not implemented therein. In this case, the discovery is performed through the NAN interface. And, a legacy MAC address (e.g., STA MAC address or BSSID) format may be used as an address format included in the Probe Request/Response when the terminal performs an active scan through the NAN interface.

Moreover, the terminal may transmit a service discovery frame in a manner that a service ID defined for a passpoint AP discovery or a WLAN network discovery is included in a service descriptor attribute. Namely, the terminal may make a request for a direct response to the AP by active solicitation. If an AP having received a service discovery frame of a subscribe type is a matched AP (e.g., an AP or device supporting a service corresponding to the service ID included in the service discovery frame of the subscribe type), the AP responds by publishing a service discovery frame type.

An embodiment about how the aforementioned Wi-Fi network discovery/access using NAN is performed will be described below. In the description below, a standby mode may mean a state that a terminal is not in use. Particularly, the standby mode may mean an off-state of a Wi-Fi module of a mobile terminal. In the standby mode, a display of a terminal may be in on- or off-state. If there is a specific input (e.g., a touch input of a type preset in a screen), the standby mode can be released. While a password function is enabled, if a specific input is applied in the standby mode, a screen for requesting a password is provided. Thereafter, if a matching password is applied, the standby mode may be released.

As described above, the terminal can search for a Wi-Fi network through the NAN interface. In doing so, the Wi-Fi module of the terminal may be in on-state [FIG. 9 (*a*)] or off-state [FIG. 9 (*b*)]. (Although a screen for a display to request a password is exemplarily shown in FIG. 9 (*a*) or FIG. 9 (*b*), the display may be in off-state or on-statefailing to be the password requesting screen.)

Figure 9:
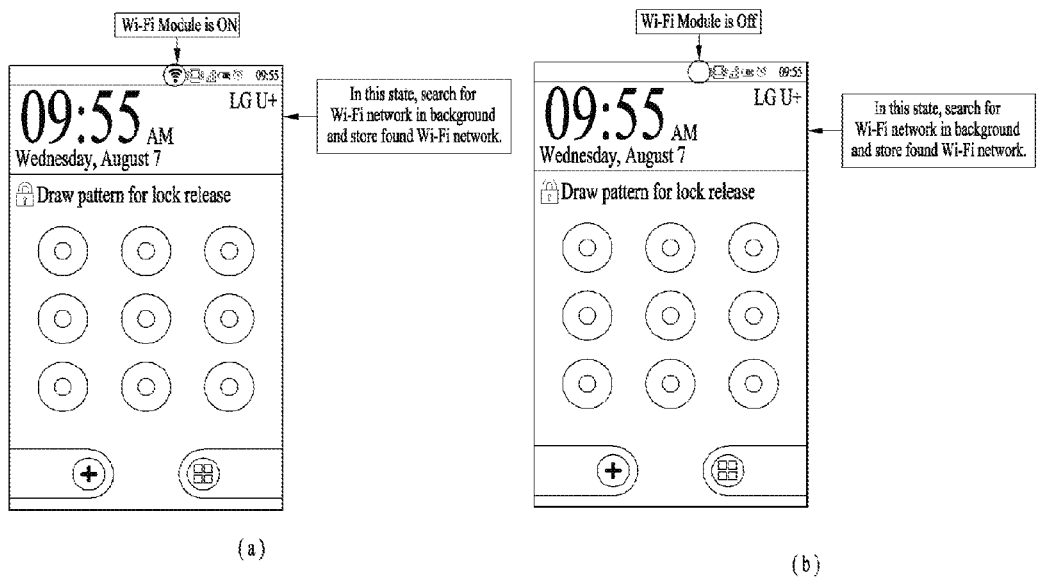
FIGS. 9 to 12 are diagrams to describe a display of a Wi-Fi network search result according to an embodiment of the present invention.
Figure 9:
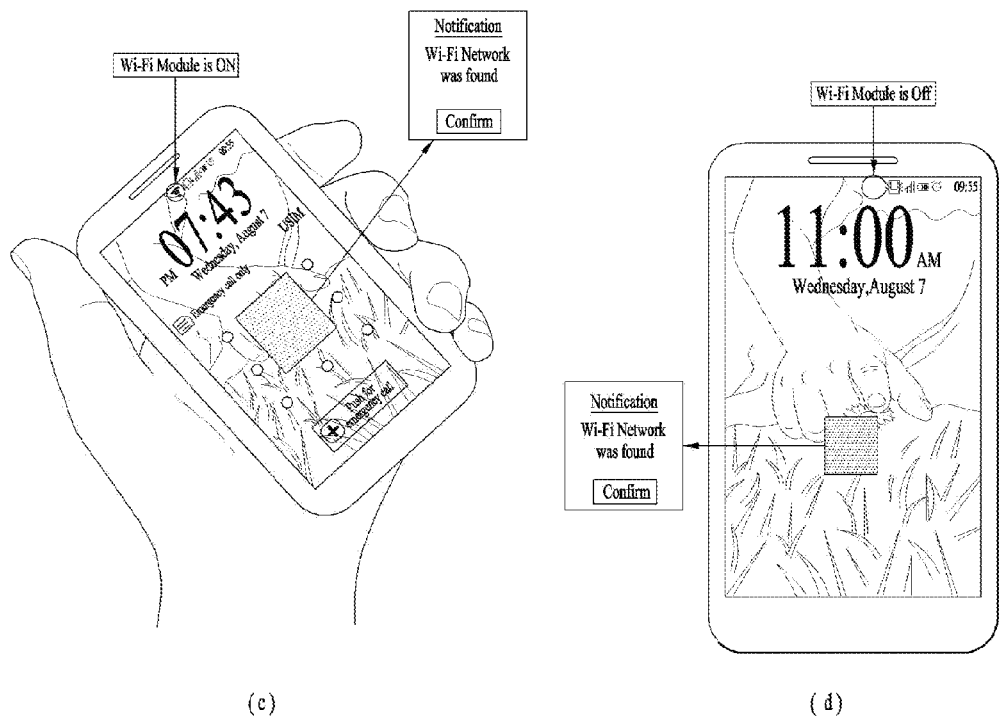

If the terminal obtains the information on the AP and is in standby mode, a pop-up window indicating the discovery of the AP may be displayed on the display of the terminal (see examples shown in FIG. 9 (*c*) and FIG. 9 (*d*)). If a (touch) input to a user's pop-up window and/or a user's input signal for standby mode release is sensed, the terminal can perform a procedure for having an association with the AP. Or, only in case of the passpoint AP, the terminal can be automatically connected to the AP when the standby mode is released.

In case that the Wi-Fi module is turned off, a procedure for querying whether a user intends to turn on the Wi-Fi module may be added. Or, when a standby mode is released, the Wi-Fi module may be configured to be automatically turned on. If the AP is a subscribed passpoint AP, the display of the pop-up window may be omitted. Or, if the terminal saves a discovered WLAN network and then goes out of the coverage, the display of the pop-up window may not be performed.

Meanwhile, unlike the above description more or less, if the standby mode of the terminal is released, the display unit of the terminal may display a pop-up window indicating that the AP has been discovered. If a user input signal for the pop-up window is received, the terminal can perform a procedure for making an association with the AP. If the AP is a subscribed passpoint AP, the display of the pop-up window may be omitted. Namely, the terminal may be automatically connected to the corresponding subscribed passpoint AP.

Figure 10:
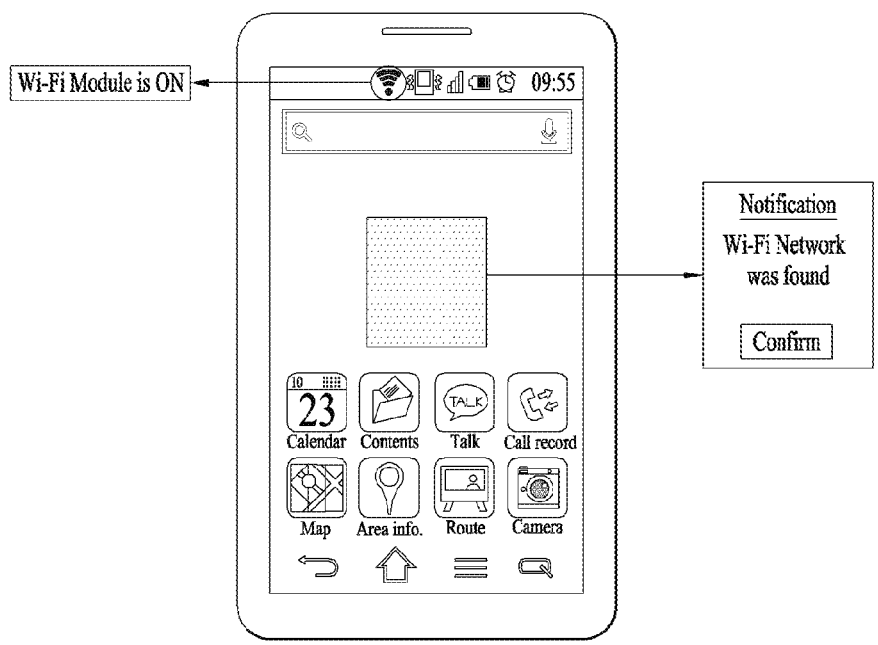
Figure 10:
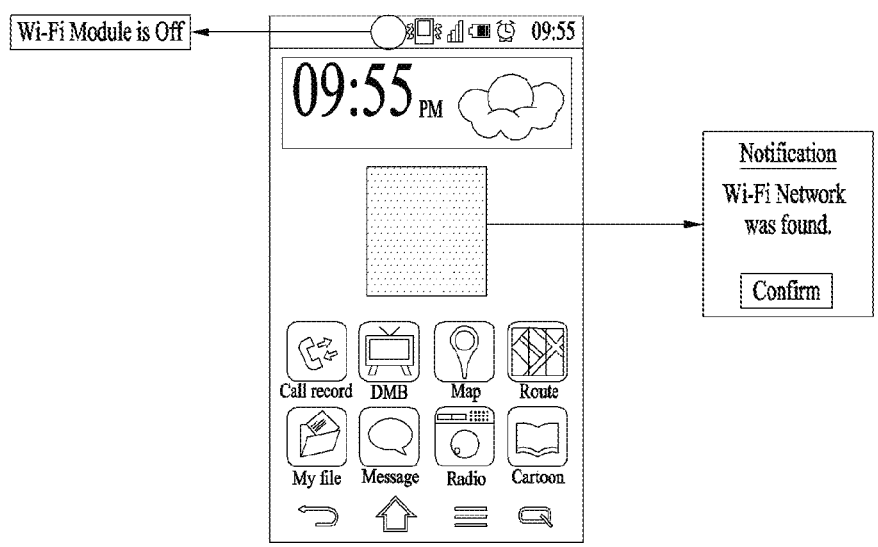

In the above description, the Wi-Fi module of the terminal may be in on- or off-state (see FIG. 10 (*a*) and FIG. 10 (*b*)). When the Wi-Fi module is in off-state, if a user input signal for the pop-up window is received, the terminal can display a pop-up window for confirming a user's intention about whether to turn on the Wi-Fi module.

Figure 11:
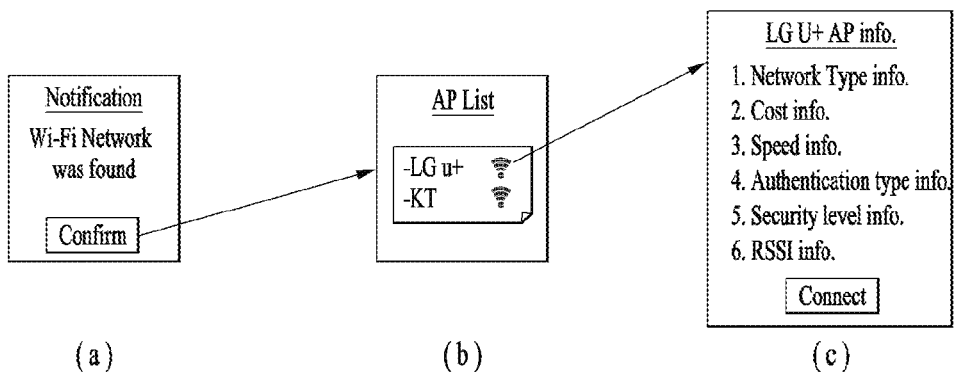
Figure 12:
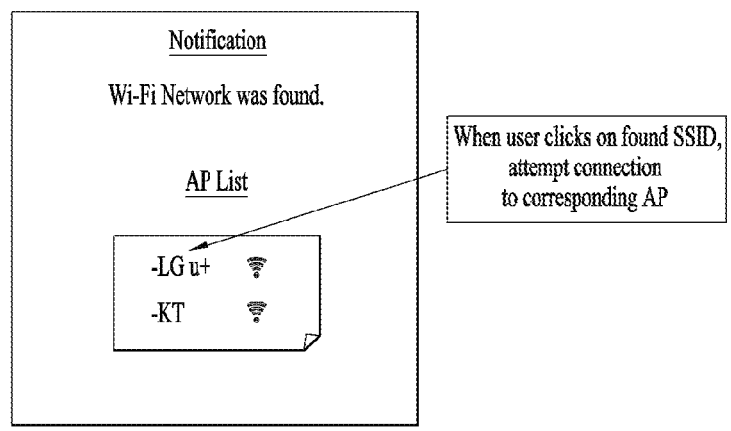

The pop-up window indicating that the terminal has discovered the AP may be configured as exemplarily illustrated in FIG. 11. Referring to FIG. 11, the terminal can display information on the discovered Wi-Fi network as a pop-upwindow (a). If a user applies an input signal to a confirmation portion of the pop-up window, the terminal can display discovered SSIDs (b). If the user applies an input signal to one of the displayed SSIDs, the terminal can display detailed AP information of the corresponding SSID (c). The detailed information may include a network type (Operator name information may be expressed, and in case of a private AP, it may be expressed as an unknown network), cost information (it may be expressed as Free or Non Free cost, and in case that costs are generated, approximate cost information may be included), speed information, authentication type information (e.g., EAP-AKA, EAP-TLS, EAP-TTLS and EAP-SIM), security level information (e.g., WPA2), RSSI information and the like. If the user applies an input signal to a connection portion in the detailed AP information, a process for a connection to the AP may be progressed. FIG. 12 illustrates an example of a case that a search alarm and an SSID display are simultaneously performed in a single pop-up window unlike the sequentially provided pop-up windows shown in FIG. 11.

In the foregoing descriptions, when the terminal searches for a Wi-Fi network through the NAN interface, it is able to preferentially search for an AP corresponding to SSID stored in the terminal. And, the Wi-Fi network having the search performed thereon may be directly installed and/or managed by an operator. Particularly, the terminal may search for a passpoint Wi-Fi network installed by a home operator of the terminal and/or a passpoint Wi-Fi network installed by a provider entering into a roaming agreement with the home operator.

Figure 13:
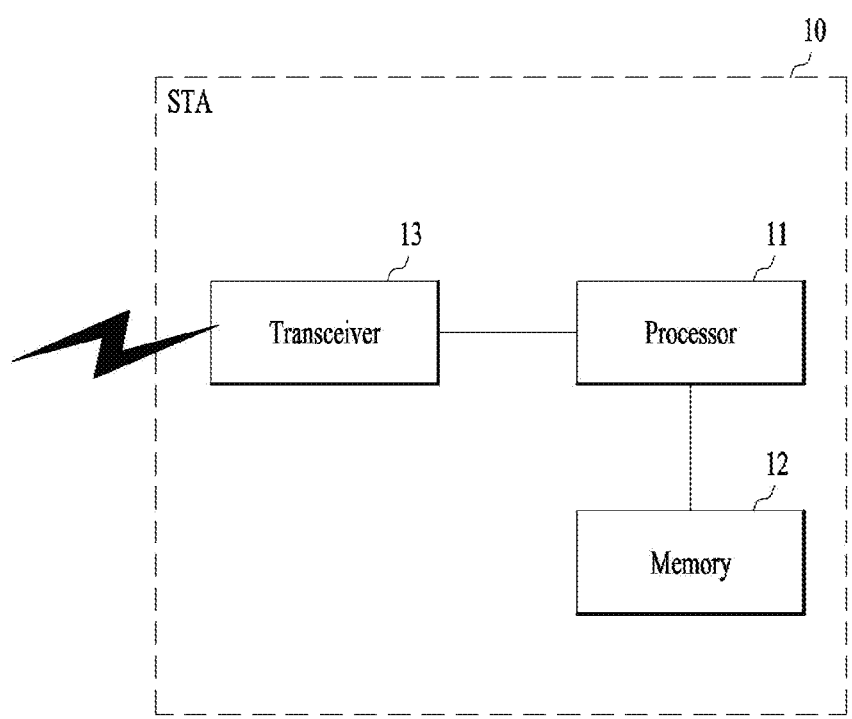
FIG. 13 is a block diagram to illustrate the configuration of a wireless device according to an embodiment of the present invention.

FIG. 13 is a block diagram to illustrate the configuration of a wireless device according to one embodiment of the present invention.

A wireless device 10 may include a processor 11, a memory 12 and a transceiver 13. The transceiver 13 may transmit/receive a wireless signal and, for example, implement a physical layer according to IEEE 802 system. The processor 11 may be electrically connected to the transceiver 13 so as to implement a physical layer and/or a MAC layer according to IEEE 802 system. And, the processor 11 may be configured to perform one or more operations of an application, a service and an ASP layer or perform an operation related to a device operating as AP/STA according to the above-described various embodiments of the present invention. Further, a module for implementing the operation of the wireless device according to various embodiments of the present invention mentioned in the foregoing description may be stored in a memory 12 and launched by the processor 11. The memory 12 may be included inside the processor 11 or installed outside the processor 11 so as to be connected to the processor 11 by a means known to the public.

The specific configuration of the wireless device 10 shown in FIG. 13 may be implemented in a manner of independently applying the points described in the above-described various embodiments of the present invention or simultaneously applying two or more embodiments, and redundant points shall be omitted for clarity.

The above-described embodiments of the present invention may be implemented through various means. For example, the embodiments of the present invention may be implemented by hardware, firmware, software or a combination thereof.

In case of implementation by hardware, the method according to embodiments of the present invention can be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors and the like.

In case of implementation by firmware or software, the method according to embodiment of the present invention can be implemented in the form of a module, a procedure, a function or the like for performing the above-described functions or operations. A software code may be stored in a memory unit and operated by a processor. The memory unit may be located inside or outside the processor, thereby transmitting/receiving data to/from the processor by already known various means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the above-described various embodiments of the present invention are described centering on IEEE 802.11 system, they are applicable to various mobile communication systems in the same manner.

What is claimed is:

1. A method of receiving a signal in a NAN (Neighbor Awareness Networking) terminal of a wireless communication system, the method performed by the terminal and comprising:
   receiving a NAN-related frame from an AP (Access Point);
   obtaining information related to the AP from information included in the NAN-related frame; and
   displaying a pop-up window indicating that the AP has been discovered if the terminal is in a standby mode state,
   wherein the information related to the AP is included either in a service ID list attribute or a wireless LAN (WLAN) infrastructure attribute.

2. The method of claim 1, wherein the infrastructure attribute includes information indicating whether the AP is a passpoint AP and information indicating an attribute of the AP if the information related to the AP is included in the WLAN infrastructure attribute.

3. The method of claim 1, wherein the AP is indicated by a service ID if the information related to the AP is included in the service ID list attribute.

4. The method of claim 1, wherein the NAN-related frame is received irrespective of whether a Wi-Fi module of the NAN terminal is turned on.

5. The method of claim 1, wherein the NAN-related frame includes a NAN discovery beacon frame, a NAN synchronization beacon frame or a NAN service discovery frame.

6. The method of claim 1, further comprising performing a procedure to associate with the AP if the standby mode state is released.

7. The method of claim 6, further comprising not displaying the pop-up window if the AP is a subscribed passpoint AP.

8. The method of claim 1, further comprising displaying a pop-up window indicating that the AP has been discovered if a standby mode state of the terminal is released.

9. The method of claim 8, further comprising performing a procedure to associate with the AP if a user input signal for the pop-up window is received.

10. The method of claim 9, further comprising not displaying the pop-up window if the AP is a subscribed passpoint AP.

11. The method of claim 1, wherein the NAN terminal supports a passpoint.

12. A NAN (Neighbor Awareness Networking) terminal in a wireless communication, the NAN terminal comprising:
    a receiving module configured to receive information;
    a display configured to display information; and
    a processor configured to:
    control the receiving module to receive a NAN-related frame from an AP (Access Point);
    obtain information related to the AP from information included in the NAN-related frame; and
    control the display unit to display a pop-up window indicating that the AP has been discovered if the terminal is in a standby mode state,
    wherein the information related to the AP is included either in a service ID list attribute or a wireless LAN (WLAN) infrastructure attribute.

13. The terminal of claim 12, wherein the infrastructure attribute includes information indicating whether the AP is a passpoint AP and information indicating an attribute of the AP if the information related to the AP is included in the WLAN infrastructure attribute.

14. The terminal of claim 12, wherein the AP is indicated by a service ID if the information related to the AP is included in the service ID list attribute.

15. The terminal of claim 12, wherein the NAN-related frame is received irrespective of whether a Wi-Fi module of the NAN terminal is turned on.

16. The terminal of claim 12, wherein the NAN-related frame includes a NAN discovery beacon frame, a NAN synchronization beacon frame or a NAN service discovery frame.

17. The terminal of claim 12, wherein the processor is further configured to perform a procedure to associate with the AP if the standby mode state is released.

18. The terminal of claim 12, wherein the processor is further configured to control the display unit to display a pop-up window indicating that the AP has been discovered if a standby mode state of the terminal is released.

19. The terminal of claim 12, wherein the NAN terminal supports a passpoint.

* * * * *